(12) United States Patent
Cusinato et al.

(10) Patent No.: US 7,642,725 B2
(45) Date of Patent: Jan. 5, 2010

(54) UNBALANCED PLURAL STRING LED DRIVER WITH COMMON RETURN RESISTOR

(75) Inventors: Paolo Giovanni Cusinato, Villeneuve-Loubet (FR); Pierre Michel Carbou, Tourrettes sur Loup (FR); Philippe Lucien Perney, Cagnes sur mer (FR)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 11/560,906

(22) Filed: Nov. 17, 2006

(65) Prior Publication Data
US 2007/0229042 A1 Oct. 4, 2007

(30) Foreign Application Priority Data
Nov. 17, 2005 (EP) .................. 05292439

(51) Int. Cl.
*H05B 37/00* (2006.01)
*G09G 5/00* (2006.01)

(52) U.S. Cl. ............... 315/185 S; 315/200 A; 315/247; 315/291; 315/312; 345/212; 345/204; 345/102; 345/82

(58) Field of Classification Search .......... 315/247, 315/246, 224, 225, 291, 307–326, 185 S, 315/200 A; 345/102, 212, 204, 213, 214, 345/82, 211, 83, 98, 99
See application file for complete search history.

(56) References Cited

U.S. PATENT DOCUMENTS

| | | | |
|---|---|---|---|
| 7,242,156 B2* | 7/2007 | Chikugawa | 315/308 |
| 2004/0066154 A1* | 4/2004 | Ito et al. | 315/291 |
| 2004/0195983 A1* | 10/2004 | Toyota et al. | 315/312 |
| 2004/0245946 A1* | 12/2004 | Halter | 315/312 |
| 2006/0082332 A1* | 4/2006 | Ito et al. | 315/291 |
| 2006/0197469 A1* | 9/2006 | Kim | 315/291 |

* cited by examiner

*Primary Examiner*—Tuyet Vo
(74) *Attorney, Agent, or Firm*—Lawrence J. Bassuk; W. James Brady; Frederick J. Telecky, Jr.

(57) ABSTRACT

The present disclosure describes systems and methods for driving light emitting diodes (LEDs). At least some embodiments include an LED driver system that includes a power supply, a plurality of current sources (each current source coupled between a common return resistor and one of a plurality of branches of series coupled LEDs, and each branch coupled between a corresponding current source and the power supply), and control logic coupled to the current sources (the control logic capable of controlling the current flow through each current source). Each of the current sources allows current to flow during one of a plurality of substantially non-overlapping time periods within a repeating time interval, each current source allowing current to flow during a different time period. The magnitude of the current flowing through each current source is substantially the same and is regulated based upon a feedback voltage across the common return resistor.

13 Claims, 3 Drawing Sheets

UNBALANCED PLURAL STRING LED DRIVER WITH COMMON RETURN RESISTOR

CROSS-REFERENCE TO RELATED APPLICATIONS

The present application claims priority to co-pending European Patent Office application Serial No. EP05292439.6, filed Nov. 17, 2005, and entitled "Switched-Current Driver for Series Connected White LEDs," which is hereby incorporated by reference.

BACKGROUND

White light emitting diodes (WLEDs) are increasingly being used as backlights in portable equipment such as personal digital assistants, cellular phones, and digital cameras. As with monochromatic LEDs, the brightness of a WLED is proportional to the current flowing through the WLED. Thus, in order to provide uniform illumination using WLEDs, it is important to ensure that the current flowing through each of the WLEDs is also uniform. Consistent current flow through a group of WLEDs may be achieved by connecting the WLEDs in series, but as WLEDs are stacked in series in this manner, the voltage needed to drive the WLEDs increases and can exceed the voltage of the power supplies available on the device. Alternatively, the WLEDs may be driven in parallel (either individually or as short series branches that are coupled in parallel to each other) to avoid the need for high-voltage power supplies. Driver circuits such as current mirrors may be used to match the current flowing through each parallel branch, but such circuits require careful matching of the components to ensure a uniform current flow through each of the WLED branches. Such matching, as well as the increased component count of the current mirror circuits over other driver circuits, may significantly increase the cost of the device, and may still not provide the desired uniformity in brightness among all the WLEDs.

SUMMARY

The present disclosure describes systems and methods for driving light emitting diodes (LEDs). At least some embodiments include an LED driver system that includes a power supply, a plurality of current sources (each current source coupled between a common return resistor and one of a plurality of branches of series coupled LEDs, and each branch coupled between a corresponding current source and the power supply), and control logic coupled to the current sources (the control logic capable of controlling the current flow through each current source). Each of the current sources allows current to flow during one of a plurality of substantially non-overlapping time periods within a repeating time interval, each current source allowing current to flow during a different time period. The magnitude of the current flowing through each current source is substantially the same and is regulated based upon a feedback voltage across the common return resistor.

Other embodiments include a current-controlled driver system, which includes a plurality of means for controlling current (each means for controlling current allowing current to flow through one of a plurality of parallel branches of series coupled components, each means for controlling current allowing current to flow during a different time period of a plurality of substantially non-overlapping time periods within a repeating time interval, and each means for controlling current allowing current to flow through a different branch); and a means for providing a feedback control voltage (each means for controlling current determining the current level flowing through a corresponding branch based on the magnitude of the feedback control voltage provided). Each means for controlling current maintains the current flowing through each corresponding branch at substantially the same magnitude.

Still other embodiments include a method of driving light emitting diodes (LEDs) that includes controlling a current level flowing through each of a plurality of parallel branches (each branch comprising one or more LEDs coupled in series with each other, each branch further comprising a current source of the plurality of current sources, and each current source coupled in series with the one or more LEDs of a corresponding branch); controlling the current level based at least in part upon a feedback voltage across a common return resistor coupled to the plurality of current sources; causing the current sources to maintain the current flowing through each of the plurality of parallel branches at substantially the same level; and enabling and disabling in sequential order each of the current sources to allow current to flow through the corresponding LED branch during one of a plurality of substantially non-overlapping time periods within a time interval.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more hardware components, and may be used to refer to an electronic device or circuit, or a portion of an electronic device or circuit.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
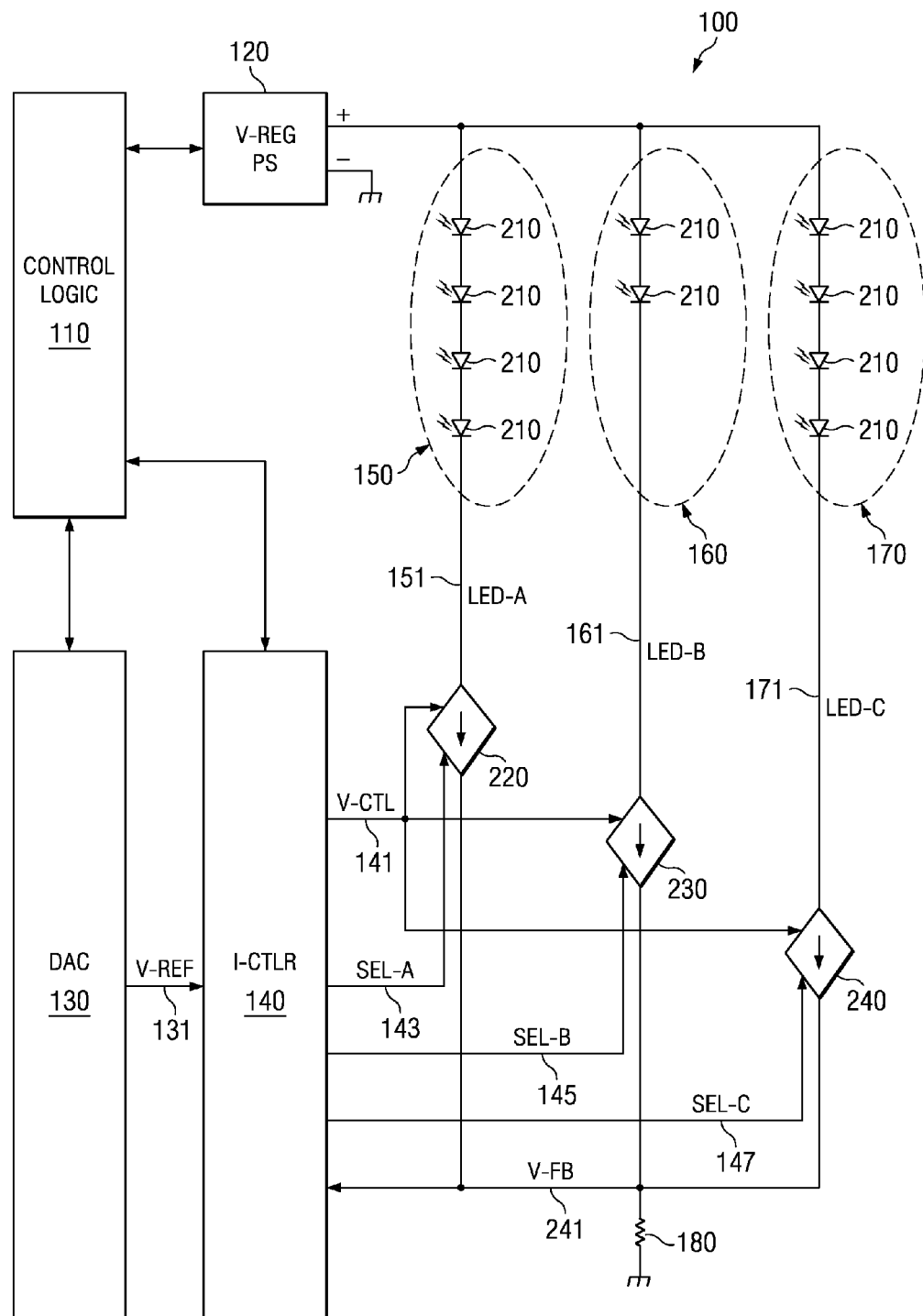
FIG. 1 shows a block diagram of a light emitting diode (LED) driver circuit, constructed in accordance with at least some preferred embodiments.

White light emitting diodes (WLEDs) are seeing increased use within mobile electronic devices in applications such as, for example, backlights for screens and keypads of personal digital assistants (PDAs) and cellular telephones. Maintaining a uniform brightness is important in such applications, and when WLEDs are utilized for illumination, such uniformity is accomplished by maintaining a consistent current flow through each of the WLEDs that provide the required illumination. FIG. 1 illustrates a WLED driver circuit 100, constructed in accordance with at least some preferred embodiments, which is designed to maintain a consistent current throughout multiple WLEDs within a plurality of branches coupled in parallel to each other. In the example of FIG. 1, voltage-regulated power supply 120 is coupled to a network of three WLED branches 150, 160 and 170, each branch comprising multiple WLEDs 210 coupled to each other in series, and each branch coupled in parallel to the other branches. Each branch 150, 160 and 170 further comprises a voltage-controlled current source 220, 230 and 240, respectively, which are coupled in series with the WLEDs of each respective branch. Each current source couples to ground through a single, shared path via return resistor 180.

Although the example of FIG. 1 shows three branches of series coupled WLEDs, two branches with four WLEDs and one branch with two WLEDs, any number of branches may be used with any number of WLEDs in each branch, and all such combinations of branches and WLEDs are intended to be within the scope of the present disclosure. Also, although the example of FIG. 1, as well as other examples presented throughout this disclosure, describes systems and methods for driving WLEDS, these systems and methods are also well-suited for use with other LEDs (e.g., monochromatic LEDs). The use of WLEDs used as backlights in a portable device is just one example of an application where consistent illumination between light sources (e.g., between WLEDs) is desirable. Other applications of the described systems and methods where consistent illumination is desirable will become apparent to those skilled in the art, and all such applications are intended to be within the scope of the present disclosure.

Continuing to refer to FIG. 1, digital-to-analog converter (DAC) 130 couples to current controller (I-Ctlr) 140, providing the controller with analog reference voltage signal (V-Ref) 131 used to set the current level flowing through each of the three WLED branches of the example of FIG. 1. Control logic 110 couples to DAC 130, providing a digital value to the DAC, which the DAC converts into analog reference voltage signal 131. The control voltage output of current controller 140 provides control voltage signal (V-Ctl) 141 to the control voltage input of each of current sources 220, 230 and 240, thereby providing a control signal that sets the level of the current flowing through each of the current sources. This in turn controls the level of illumination of each of the WLEDs coupled in series with each of the current sources 220, 230 and 240. Multiple selection-control outputs of current controller 140 each generate a selection control signal (SEL-A 143, SEL-B 145 and SEL-C 147). Each selection control output couples to a single select enable input on each of current sources 220, 230 and 240, enabling each current source whenever the corresponding selection control signal is asserted. Control logic 110 also couples to voltage-regulated power supply 120 and current controller 140. Control logic 110 thus provides overall control of WLED driver circuit 100 by setting the voltage level of power supply 120, and by setting the current level flowing through each current source 220, 230 and 240 as selected by selection control signals 143, 145 and 147. This control determines, among other things, the brightness level of each of the WLEDs.

Figure 2:
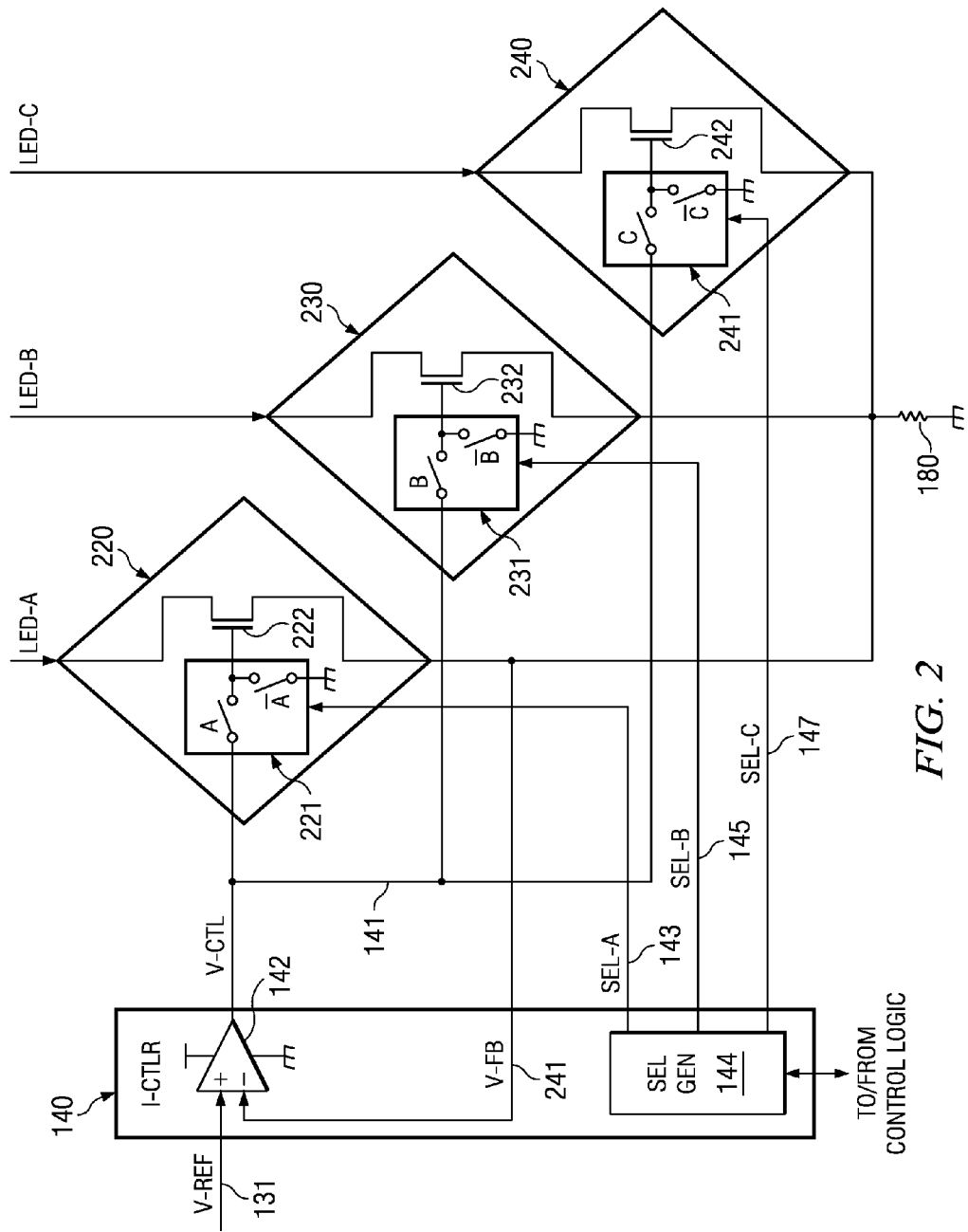
FIG. 2 shows a detailed diagram of the voltage-controlled current sources of FIG. 1, in accordance with at least some preferred embodiments.

As already noted, in order to maintain a consistent level of brightness between each of the WLEDs 130, the current in each of the branches 150, 160 and 170 must be maintained at substantially the same level. Such consistency is obtained, at least in part, by coupling each of the voltage-controlled current sources 220, 230 and 240 to common return resistor 180, thus providing a single, common feedback point for each of the current sources. FIG. 2 illustrates a detailed circuit diagram of the voltage-controlled current sources and the current controller, in accordance with at least some preferred embodiments. Reference voltage signal (V-Ref) 131 is applied to the non-inverting input (+) of differential amplifier 142 of current controller (I-Ctlr) 140. Differential amplifier 142 compares reference voltage signal 131 to feedback voltage signal (V-FB) 241 (applied to the inverting input (−) of differential amplifier 142). The inverting input of differential amplifier 142 couples to a common return and feedback point located between resistor 180 (a resistor with a relatively low resistance in at least some preferred embodiments) and the return side of voltage-controlled current sources 220, 230 and 240. Resistor 180 also couples to ground, thus providing a return path for the current flowing through each of the current sources.

The voltage that develops across resistor 180 is proportional to, and a result of, the current flowing through each of the current sources (220, 230 and 240), each WLED branch (150, 160 and 170), and the resistor (180), and is thus used as feedback voltage signal 241. Feedback voltage signal 241 is compared to reference voltage signal 131 by differential amplifier 142 to generate control voltage signal (V-Ctl) 141. Control voltage signal 141 is applied to the control input of each of voltage-controlled current sources 220, 230 and 240 (through each of select switches 221, 231 and 241 respectively) to regulate the magnitude of the current that flows through each current source. In the preferred embodiment of FIG. 2, for example, if feedback voltage 241 is significantly below reference voltage 131 (indicating a lower current flow than desired), differential amplifier 142 generates a large positive control voltage 141, allowing the pass transistors 222, 232 and 242 of each corresponding enabled current source to sink a higher amount of current through each branch. If feedback voltage 141 is near or above reference voltage 131, differential amplifier 142 generates a much smaller or negative control voltage 141, which in turn reduces and/or turns off pass transistors 222, 232 and 242 of each corresponding enabled current source, reducing the amount of current flowing through each branch of WLEDs.

Current controller 140 also includes selection signal generator 144, which, in accordance with at least some preferred embodiments, generates three selection signals (Sel-A, Sel-B and Sel-C) 143, 145 and 147, on each of three selection signal outputs. Each of these outputs couples to a selection input on each of the current sources, controlling the corresponding select switch (221, 231 and 241 respectively) within the current source. As one of ordinary skill in the art will appreciate, such switches may include either mechanical relay switches or solid state switches, to name just a few, and all such switches are intended to be within the scope of the present disclosure.

Continuing to refer to the example of FIG. 2, Sel-A signal 143 controls switch 221 within voltage-controlled current source 220. When the Sel-A signal is asserted the "A" port of select switch 221 couples the output of differential amplifier 142 to the gate of pass transistor 222, while the "$\overline{A}$" port of switch 221 disengages. This configuration allows control voltage signal 141 to turn on pass transistor 222 and regulate the amount of current flowing through current source 220 (and thus through the LED-A path and WLED branch 210 of FIG. 1). Continuing to refer to FIG. 2, when the Sel-A signal is de-asserted, the "$\overline{A}$" port of switch 221 engages and the "A" port disengages, coupling the gate of pass transistor 222 to ground. Coupling the gate of pass transistor 222 to ground when it is not coupled to the output of differential amplifier 142 assures that pass transistor 222 is turned off and avoids unwanted leakage currents through the device. The Sel-B and Sel-C signals control switches 231 and 241, respectively, to enable and disable voltage-controlled current sources 230 and 240 in a similar manner.

The use of individual selection signals makes it possible to selectively strobe each of WLED branches 150, 160 and 170 of FIG. 1 in sequence. By enabling only one current source at a time in a non-overlapping manner, it is possible to regulate the current flowing through each WLED branch to substantially the same level. This is because the same return resistor and the same differential amplifier is used, regardless of which branch is enabled and conducting. The current flows through resistor 180, resulting in the same voltage drop across resistor 180 for a given current. This voltage drop (feedback voltage signal 241) is compared to the same reference voltage signal 131 by the same differential amplifier 142, regardless of which branch is enabled.

Figure 3:
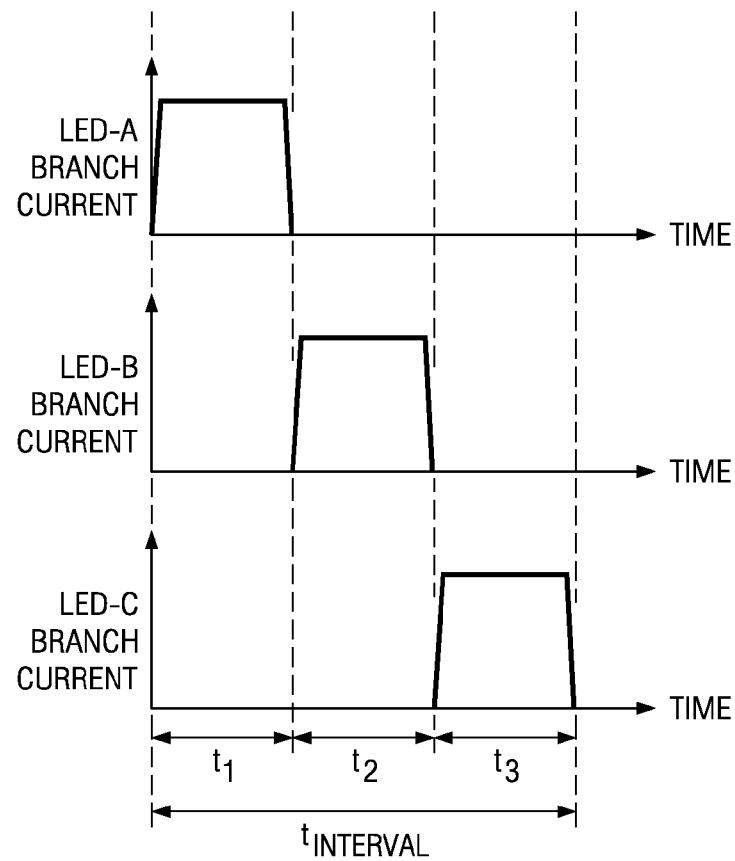
FIG. 3 illustrates how current is switched between LED branches, in accordance with at least some preferred embodiments.

FIG. 3 graphically depicts how the current sources are enabled in a substantially non-overlapping manner, in accordance with at least some preferred embodiments. The current is not constant over time in each branch but is switched on and off (e.g., by using an embedded finite state machine to implement selection generator 144). The period of current flow in each of the branches does not substantially overlap with the period of current flow in any other branch. In the embodiment illustrated in FIG. 3, for example, the LED-A branch is active for a first time period $t_1$, the LED-B branch is active for a time period $t_2$, and the LED-C branch is active for a time period $t_3$. This sequence represents a total time interval $t_{interval}$, which is repeated at a high enough rate so as to cause all of the WLEDs to appear to a person as a continuous and uniform source of light. In at least some preferred embodiments, this repetition rate is set at 167 Hz (i.e., $t_{interval}$=6 mSecs).

One of the consequences of pulsing the current flowing through the current sources as described above is that the brightness perceived by a person observing the WLEDs is higher for a given average current level than for WLEDs driven continuously at that same average current level. When the human eye is exposed to a bright light, the eye "remembers" the maximum intensity of the light for a short period of time, a characteristic known as "persistence." Persistence is what allows the human eye to perceive a motion picture or television image as a continuous and fluid moving image when, in fact, the image is a succession of still images flickering at a rate of 24 to 30 times per second. In a similar manner, when a WLED is flashed on brightly for a short time and then turned off, the eye "remembers" the light at the high brightness level for a short period of time (the persistence period).

If the WLED is repeatedly flashed using pulses that have a flashing interval that is shorter than the persistence period of the human eye, the flashes are perceived as a continuous, steady light with a brightness at or approaching the maximum brightness of the flashes. Thus, for example, if a WLED is pulsed at a maximum current level of 60 mA for ⅓ of the time (i.e., a 30% duty cycle), the perceived brightness of the WLED is higher than the perceived brightness corresponding to that of a WLED driven at a continuous current of 20 mA, even though both WLEDs are being operated at the same average current level (20 mA).

Thus, for a given brightness level, a WLED driver generating pulsed and multiplexed signals on sequentially selected parallel branches of WLEDs uses less power than that required of a circuit that drives all of the branches continuously and simultaneously. Also, such a WLED driver allows for a more efficient integration of at least some of the components of power supply 120, DAC 130, and each of the current sources 220, 230 and 240 of FIG. 1. The supply voltage required to drive multiple parallel branches of WLEDs is not as high as the supply voltage required to drive WLEDs that are all coupled together in series. This lower supply voltage requirement permits a the use of a smaller power MOS, such as that used in a switching power supply, which can be integrated on a chip together with the other components listed above in at least some preferred embodiments. The components of the current sources coupled to each branch of WLEDs also can be smaller in size, due to the decreased voltage and power requirements, also making these component good candidates for chip integration. Furthermore, compared to a WLED operating under a comparable continuous current level, a WLED that is pulsed and multiplexed will operate at a decreased level of both the cumulative photons produced and the junction operating temperature, both of which are factors that determine (and thus limit) the operational life of a WLED.

Figure 4:
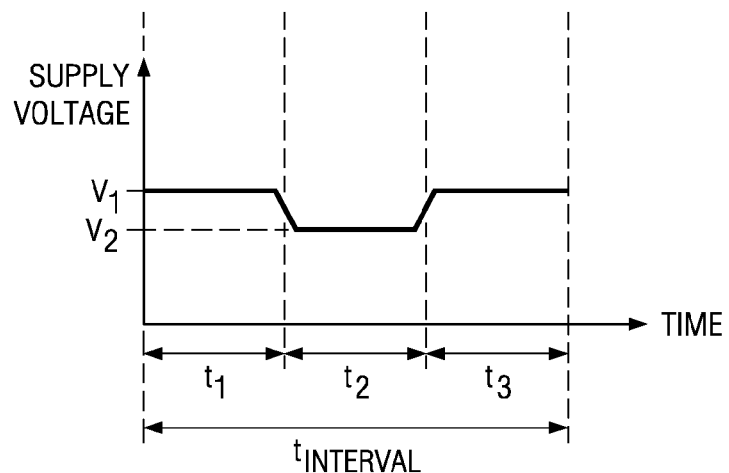
FIG. 4 illustrates how the supply voltage may vary when driving different LED branches, in accordance with at least some preferred embodiments.

As already illustrated, at least some of the preferred embodiments utilize a voltage-regulated power supply. The use of a voltage-regulated supply permits each branch to include a different number of WLEDs, since the supply is capable of dynamically changing its regulated voltage to the magnitude required for the pulses applied to each branch. Varying the voltage to match the requirements of each branch also ensures that no more than the minimum operating voltage level is applied across each branch, which reduces the overall power consumption of each WLED branch and lengthens the life of the WLEDs. For example, in the preferred embodiment shown in FIG. 1, WLED branch B only has two WLEDs, as compared to four WLEDs in each of branches A and C. Since each WLED requires 3-4 volts to operate, and since branch B has two WLEDs less than branches A and C, branch B requires an operating voltage that is 6-8 volts lower than the other branches. FIG. 4 illustrates an example of how the voltage is varied to accommodate the WLED configuration of the preferred embodiment of FIG. 1. During time period $t_1$, the voltage applied across the WLEDs is set by control logic 110 and maintained at voltage level $V_1$, as shown in FIG. 4. This is the voltage required to drive the four WLEDs of the LED-A branch. During time period $t_2$, the voltage output of the voltage regulator is set by control logic 110 to voltage level $V_2$, the voltage required to drive the two WLEDs of the LED-B branch. Subsequently during time period $t_3$, the voltage is raised by control logic 100 back to voltage level $V_1$, the voltage level required to drive the four WLEDs of the LED-C branch. In each case, the current regulation provided by the voltage-controlled current sources maintains the current level through each branch at the same level set by the value loaded into DAC 130 by control logic 110.

Although the level of current (and thus the level of illumination) in the various WLED branches of the preferred embodiments described are maintained at the same value, in other embodiments the illumination levels may be different. Thus, for example, control logic 110 of FIG. 1 may be configured to maintain LED branches A and B at one level of illumination (e.g., to illuminate a display on a cellular telephone), while maintaining LED branch C at a different, lower level of illumination (e.g., to illuminate the keypad of the same cellular telephone). Many other combinations of current levels, voltage levels, illumination levels, numbers of LEDs, and numbers of LED branches will become apparent to those skilled in the art, and all such combinations are intended to be within the scope of the present disclosure.

Numerous variations and modifications will become apparent to those skilled in the art once the above disclosure is fully appreciated. For example, although the embodiments described are shown driving white LEDs, the systems and methods described are equally applicable to other forms of light emitting diodes, or any other electronic component, LED or otherwise, that requires precise, consistent, and regulated control of the current flowing through multiple components within an electronic device or circuit. It is intended that the following claims be interpreted to embrace all such variations and modifications.

What is claimed is:

1. Light emitting diode driver circuitry, comprising:
   A. a first lead adapted to be connected to the cathode of at least one first light emitting diode;
   B. a second lead adapted to be connected to the cathode of at least one second light emitting diode, which is different than the first light emitting diode, and the number of light emitting diodes to be connected to the second lead being different than the number of light emitting diodes to be connected to the first lead;
   C. a third lead connected to circuit ground through a resistor;
   D. first current source circuitry selectively connecting the first lead to the third lead and having a control voltage input and a select input;
   E. second current source circuitry selectively connecting the second lead to the third lead and having a control voltage input and a select input;
   F. differential amplifier circuitry having one input connected to a reference voltage, another input connected to the third lead, and a control voltage output connected to the control voltage input of the first current source circuitry and the second current source circuitry; and
   G. selection circuitry having a first select output connected to the select input of the first current source circuitry and a second select output connected to the select input of the second current source circuitry.

2. The driver circuitry of claim 1 in which the first current source circuitry includes a pass transistor connected between the first lead and the third lead.

3. The driver circuitry of claim 1 in which the first current source circuitry includes a pass transistor connected between the first lead and the third lead, and the second current source circuitry includes a pass transistor connected between the second lead and the third lead.

4. The driver circuitry of claim 1 in which the first current source circuitry includes a switch having an input connected to the control voltage input, an output, and a control input connected to the select input.

5. The driver circuitry of claim 1 in which the first current source circuitry includes a switch having an input connected to the control voltage input, an output, and a control input connected to the select input, and the second current source circuitry includes a switch having an input connected to the control voltage input, an output, and a control input connected to the select input.

6. The driver circuitry of claim 1 in which the first current source circuitry includes a pass transistor connected between the first lead and the third lead, the pass transistor having a control lead, and includes a switch having an input connected to the control voltage input, an output connected to the control lead of the pass transistor, and a control input connected to the select input.

7. The driver circuitry of claim 1 in which the first current source circuitry includes a pass transistor connected between the first lead and the third lead, the pass transistor having a control lead, and includes a switch having a first input connected to the control voltage input, a second input connected to circuit ground, an output connected to the control lead of the pass transistor, and a control input connected to the select input.

8. The driver circuitry of claim 1 in which the first lead is connected to a series of four white light emitting diodes and the second lead is connected to a series of two white light emitting diodes.

9. The driver circuitry of claim 1 including a digital to analog converter having a reference voltage output connected to the one input of the differential amplifier circuitry.

10. The driver circuitry of claim 1 including a voltage-regulated power supply having a ground lead connected to the circuit ground connected to the resistor and having a power lead adapted to be connected with the anodes of the at least one and second light emitting diodes.

11. The driver circuitry of claim 1 in which the selection circuitry provides select signals to the first and second current source circuitries at non-overlapping intervals.

12. The driver circuitry of claim 1 in which the selection circuitry provides select signals to the first and second current source circuitries at non-overlapping intervals at a frequency of about 167 Hertz.

13. A light emitting diode system, comprising:
   A. a first branch of series coupled white light emitting diodes having an anode lead and a cathode lead;
   B. a second branch of series coupled white light emitting diodes having an anode lead and a cathode lead, the number of light emitting diodes in the second branch being different than the number of light emitting diodes in the first branch;
   C. a third lead connected to a circuit ground lead through a resistor;
   D. first current source circuitry selectively connecting the cathode lead of the first branch to the third lead and having a control voltage input and a select input;
   E. second current source circuitry selectively connecting the cathode lead of the second branch to the third lead and having a control voltage input and a select input;
   F. differential amplifier circuitry having one input connected to a reference voltage, another input connected to the third lead, and a control voltage output connected to the control voltage input of the first current source circuitry and the second current source circuitry;
   G. selection circuitry having a first select output connected to the select input of the first current source circuitry and a second select output connected to the select input of the second current source circuitry, the selection circuitry providing select signals to the first and second current source circuitries at non-overlapping intervals shorter than the persistence of the human eye; and
   H. voltage regulated power supply circuitry having a supply lead connected to the anode lead of the first and second branches and a circuit ground lead connected to the resistor.

* * * * *